3,793,241
DIMENSIONALLY STABLE HYDROPHILIC FOAM AND METHOD OF PREPARING SAME
Robert C. Kyle, Minneapolis, and John F. Kistner, Afton, Minn. (both c/o 3M Center, St. Paul, Minn. 55133)
No Drawing. Filed Mar. 20, 1972, Ser. No. 236,465
Int. Cl. C08g 22/44
U.S. Cl. 260—2.5 AD                                    6 Claims

ABSTRACT OF THE DISCLOSURE

Resilient, crosslinked, hydrophilic, open-celled polyoxyalkylene urea/urethane foam comprising hydrophilic and hydrophobic segments of relatively high molecular weight, the foams having relatively high resistance to bottoming out and good dimensional stability with absorption of water, and a process for preparing the same.

BRIEF SUMMARY OF THE INVENTION

The present invention relates to resilient, cross-linked, hydrophilic, open-celled polyoxyalkylene urea/urethane foam comprising hydrophilic and hydrophobic segments of relatively high molecular weight, the foams having relatively high resistance to bottoming out and good dimensional stability with absorption of water. The foams are useful in various cushioning applications, particularly in the area of shoe insoles. The invention also relates to a process for the preparation of the foams.

Polyoxyalkylene/polyisocyanate - type polyurethane foams, have been disclosed heretofore, e.g. see U.S. Pats. 2,949,431, 2,965,584, 3,413,245, 3,021,290 and 3,457,203. These foams are of use as sponges, washcloths, mops, etc. but generally are unsatisfactory in cushioning products designed to bear weight since they do not also combine the properties of density, strength, firmness and resilience in sufficient degree. In some applications also, including that of shoe insoles, the considerable expansion of these foams upon absorption of water cannot be tolerated.

Certain prior art polyurethane foams have been disclosed to be useful as cushions. Such foams, however, lack the combination of properties of the present materials and would not be satisfactory in their primary areas of use. Thus, U.S. Pat. 3,021,290 discloses foams prepared from a polyalkylene ether glycol, an organic polyisocyanate having two to three functional isocyanate groups, an activator mixture comprising a small amount of water (not more than 5 percent of the weight of the glycol and the isocyanate) together with a reaction catalyst and a wood cellulose filler. Considerable heat is required to bring about the foaming reaction to produce the compositions of the afoersaid patent (e.g. 1 hour at 115 to 120° C., room temperature for 16 hours then 115 to 120° C. for an addtional 8 hours). The resulting foams are disclosed in the patent to have densities between 2 and 3 pounds per cubic foot, and compress to 50 percent of their initial thickness under pressures of about 0.8 pound per square inch. These foams differ greatly from the foams of the present invention as to their physical properties as well as their chemical makeup.

Foamed shoe insoles are known but they utilize closed cell, hydrophobic foams. The closed cell structure has been necessary in such compositions to obtain both the needed resistance to bottoming out at high load and the softness at low load, and to achieve them in the necessarily thin cross section of shoe insoles. Such foams, however, can be quite uncomfortable. The closed cell structure (which does not breathe) does not allow the heat generated by the foot to dissipate or the moisture from perspiration to be removed from the surface of the foot. Even had it been possible to develop sufficient load carrying properties with insoles of open-celled foams of the hydrophobic types previously used, there would have been considerable discomfort, since, under high loads, the moisture would be squeezed back out of the foam and into contact with the foot. These problems of heat and moisture, furthermore, become considerably more acute when the wearer is walking, running or otherwise exercising, since both are then generated by the foot in considerably greater quantities. The pressure and frequency of flexing are also greater when the wearer is exercising.

It is an object of the invention to provide novel resilient open-celled hydrophilic polyoxyalkylene urea/urethane foams. It is another object of the invention to provide novel unitary articles comprising in combination a resilient open-celled hydrophilic polyoxyalkylene urea/urethane foam portion and a fibrous assembly portion. It is another object of the invention to provide shoe insoles comprising resilient open-celled hydrophilic polyoxyalklene urea/urethane foam. It is another object of the invention to provide unitary articles comprising in combination resilient open-celled hydrophilic polyoxyalkylene urea/urethane foam and a needle punched fibrous assembly. It is another object of the invention to provide unitary articles comprising in combination resilient open-celled hydrophilic polyoxyalkylene urea/urethane foam and fibrous assembly portions which have been needle punched together. It is a further object of the invention to provide a process for the preparation of resilient open-celled hydrophilic polyoxyalkylene urea/urethane foams. Still other objects of the invention will become apparent to those skilled in the art from reading this specification.

DETAILED DESCRIPTION

The foams of the present invention comprise in the main an intimate physical intermixture of two polymeric networks which are for the most part chemically separate but which contain a minor proportion of chemical (urea and urethane) links between them, the first network being hydrophilic and the second being hydrophobic. The hydrophilic network contains hydrophilic oxyalkylene chains joined together by urea linkages and, at most, a low degree of crosslinking. The hydrophobic network contains hydrophobic oxyalkylene chains joined through groups of the type $Ar(NHCO_2)_n$ wherein Ar is an n-valent aromatic group and $n$ is greater than 2. Preferably $n$ is not more than 4, most preferably it is not greater than 3. The hydrophobic network is more highly crosslinked and serves to reinforce and stabilize the foam (resulting in considerably greater dimensional stability with water absorption and resistance to bottoming out).

Due to the hydrophilic nature of the foams, a considerable amount of the water they absorb under conditions of high humidity (and release under conditions of lower humidity) is "bound" water which is absorbed by the composition itself and cannot be removed by pressure or wringing out. This is in contrast to hydrophobic foams in which water taken into the void spaces can be all or substantially all removed by pressure.

The hydrophilic and open-celled properties of the foams of the invention, in combination with their other properties render them particularly suitable for use in cushion applications in which the foam is used in close proximity to the surface of the human body. Exemplary of such applications is the shoe insole. Shoe insoles are used to obtain resilience, support and comfort for the foot whether the wearer is sitting, standing, walking or running. To provide the necessary resilience and support, the composition must, in a relatively thin cross section, resist "bottoming out" (i.e. reaching an essentially uncompressible state) even under relatively high pressures. At the same time it is desirable that the insole be relatively soft under low pressures (i.e. have relatively high deflection at low load). Insoles should also spring back to nearly full thickness after repeated or prolonged compressions under the conditions of use (i.e. have low compression set).

More specifically, the present invention relates to resilient, crosslinked, hydrophilic, open-celled polyoxyalkylene urea/urethane foam comprising two types of relatively high molecular weight segments as follows:

(A) hydrophilic segments containing polyoxyalkylene chains predominantly interconnected by urea links, at least 50% of the individual oxyalkylene groups therein being oxyethylene groups, and
(B) hydrophobic segments containing polyoxyalkylene chains and aromatic hydrocarbon groups predominantly interconnected by urethane links, the individual oxyalkylene groups substantially all containing more than two carbon atoms, the foam having (1) A water absorbing capacity ($\Delta W_f$) of at least about 700 percent by weight.
(2) A density of at least 8 pounds per cubic foot (125 kg./m.$^3$).
(3) A volume change upon absorption of water $$\Delta V_s / \Delta W_b$$

of less than 0.4 percent per weight percent of absorbed water.
(4) A twenty-four hour compression set ($\Delta C$) of less than 75 percent.
(5) A bound water pickup ($\Delta W_b$) of at least 100 percent by weight.

Ordinarily and preferably, the volume change of the foam with water absorption, $\Delta V_s$, is not more than about 35 percent in the foams of the invention. Test procedures for measuring these properties are described hereinafter.

The foams of the invention may be cast in molds or spread as films. The surface of such foams has a tough skin which, nevertheless, has the same moisture absorptivity as the body of the foam because the polymer itself is hydrophilic. The skin is such that cushions and pads molded from the foam form stable, tear-resistant and smooth surfaces and, therefore, for many purposes advantageously do not require a protective fabric or coating. Because of the resilience, compression set resistivity, softness, moisture absorption and water vapor transmission properties of the foams, highly desirable and comfortable cushions and pads for use in contact with the human body may be prepared, as, for example, cushions for chairs, farm equipment, sofas, automobiles and other vehicles and pads for protection of various parts of the anatomy such as protective pads for athletes, e.g. knee pads, kidney pads, shoulder pads and helmet liners. Sweat bands for use in hats, and head coverings per se are also contemplated, as are pads for underarm protection of clothing.

As previously noted, an especially valuable use of the structurally reinforced hydrophilic foams of the invention is in insoles for shoes and boots. The foam provides a satisfactory supporting foundation for the foot and is equal to or better than leather in its softness, moisture absorption and moisture- and air-permeability. Insoles may be cut to shoe sole shape from a sheet of the foam that has been cast to ⅛ inch or more in thickness (preferably about ¼ inch) and that has a tough surface skin. The upper and/or lower surface of the insole may have one or more layers of a woven or non-woven fiber textile material fastened to it.

A wide variety of fibrous assemblies (including woven and non-woven fabrics, compressible mats, etc.) can be used in connection with the foamed compositions of the present invention. These can be adhered to one or both sides of already formed foam (e.g. using a spray adhesive), or the foam can be formed in contact with a fibrous assembly, or between two assemblies, or the assembly can be impregnated with the liquid foam-forming composition and the latter then foamed. Such fibrous assemblies impart desirable properties to the overall composite such as improved tensile properties, increased dimensional stability and surface toughness and strength. Normally the fibrous assemblies are breathable, in order to take advantage of the hydrophilic nature of the underlying foam.

If desired, a fibrous assembly can be compressed or molded during or just after foaming, or prior to combining with the foamed composition, and correspondingly a wide variety of products can be obtained. The assembly of fibers can be a mat of interpenetrated crimped continuous fibers which, when coated and impregnated with the compositions of the invention, form a leather-like sheet material. Another satisfactory fibrous assembly is non-woven nylon fabric such as, for example, nylon scrim.

Another embodiment of shoe and boot insoles prepared from the structurally reinforced hydrophilic foams of the invention comprises a layer of the reinforced hydrophilic polyoxyalkylene foam that has been made by skiving large loaves of the foam into sheets having a thickness of from about 0.12 to 0.5 inches. (This skived foam can also be used in other cushion and pad applications such as those described above.) One or more layers of a textile fabric or polymer film may be fastened to the sheet of skived foam. A preferred method is to cover a skived foam sheet with a non-woven web of natural or synthetic fibers. This may be done by forming a non-woven web of fibers, such as, for example, a non-woven web from one inch staple 4 denier dacron fibers or nylon fibers in a "Rando-Webber" machine, superimposing the non-woven web onto the skived foam sheet, and subjecting the assembly to needle punching in a needle felting machine.

In another preferred embodiment, the fibrous assembly is passed through a needle punching machine to effect consolidation of the assembly. The punched assembly is then impregnated with the liquid foam forming composition of the invention. Alternatively, the foam can be prepared separately and a fiber assembly, such as a random webbed material of rayon, nylon, etc., needle punched directly onto (and through) the foam using 30–50 punches per square inch, with or without an adhesive. The fibrous assemblies in these embodiments provide a pleasant feel and additional resistance to swelling of the foam upon absorption of moisture.

The needle punching forces fibers of the web into and through the foam to lock the web to the foam and also to provide a covering of fibers on the reverse side of the foam. The sheets of hydrophilic foam having a covering of non-woven fibers bonded by needle punching may then be cut to size to form dimensionally stable insoles.

The "Rando-Webber" machine for making the non-woven web is available from the Curlator Corporation of East Rochester, N.Y. Needle punch machines suitable for bonding non-woven webs to various substrates are available from the James Hunter Corporation of North Adams, Mass.

The sheets of hydrophilic foam having a covering of non-woven fibers bonded by needle punching may also be used in clothing, e.g. for linings of arctic clothing where the hydrophilic foam provides insulation and comfort because of its capacity to absorb water vapor and lose moisture by transpiration.

The foams of the present invention are prepared by
(1) Forming a miscible blend of 100 parts of a water soluble linear hydrophilic isocyanate-terminated polyoxyalkylene prepolymer (I) having a molecular weight of from about 400 to 3000 and in which at least 50 percent of the oxyalkylene groups are oxyethylene and from 3 to 15 parts of an aromatic isocyanate compound (II) having an isocyanate functionality greater than 2 and an equivalent weight with respect to isocyanate of from about 80 to 240, (2) Dispersing 20 to 60 parts of a linear hydrophobic hydroxyl-terminated polyalkylene oxide prepolymer (III) having a molecular weight of about 400 to 6000 in at least 20 parts of water, (3) Mixing the blend of step (1) with the dispersion of step (2) at a temperature at which the dispersion is liquid, but not above 10° C. to form a homogeneous mixture, and (4) Maintaining the mixture at a temperature below 25° C. until the resulting chemical reaction is substantially complete and a solid foam has been formed.

The weight ratio of the water to the total weight of the other three components in the charge may be 2 or more and is preferably 0.5 to 1.5. If desired, fillers, surfactants, colorants, reaction catalysts, etc. can be added to blend (1) or dispersion (2) before the two are mixed.

The four constituents of the process and the reactive species in each are as follows:

In blend (1):
(I) The hydrophilic prepolymer—NCO groups
(II) The polyfunctional aromatic isocyanate—NCO groups In dispersion (2):
(III) The hydrophobic prepolymer—OH groups
(IV) The water—H₂O Neither blend (1) nor dispersion (2) reacts chemically. However, when the two are combined to form the foaming mixture, chain extending and crosslinking reactions take place simultaneously and rapidly. The speed of reaction will vary somewhat depending upon the particular materials present, and the concentrations thereof but generally if the constituents are at room temperature (about 25° C.) when combined, the mixture must be coated, cast or molded within one minute. If the dispersion is cooled to ice temperature (about 0° C.) the time can be extended to 2 to 3 miutes, or in some cases to as long as 10 minutes. The foam forms and solidifies quickly (usually within 45 minutes at room temperature). Within 2 hours at room temperature the reaction is substantially complete and the foam has reached its final physical properties and can be used. Any excess of water present can be removed simply by squeezing the foam or air drying.

The individual chemical reactions occurring in the foam formation can be characterized as follows:

Formation of a molecule of gas and and a urea group

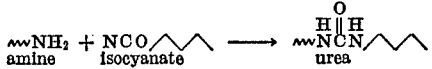

Formation of a urethane group

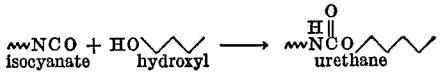

Of these possible reactions, the reaction of the isocyanate groups of prepolymer (I) with the water (IV) (resulting in long chain, hydrophilic essentially linear segments consisting essentially of oxyalkylene chains joined by urea groups) and the reaction of the isocyanate groups of polyfunctional aromatic isocyanate compound (II) with the hydroxyl groups of prepolymer (III) (resulting in relatively high molecular weight, hydrophobic crosslinked segments consisting essentially of oxyalkylene chains joined by groups of the type $Ar(NHCO_2)_n$, wherein Ar is an n-valent aromatic group and $n$ has an average value greater than two) are strongly favored. The tendency of (I) to react with (IV) rather than with (III) is shown by its relative reaction rates with them, i.e. (I) reacts in minutes (e.g. 3–5 minutes) with (IV) but requires hours (e.g. 8–24 hours) to react with (III). Compound (II) and prepolymer (III) are both water insoluble, but (II) is soluble in (III). Also (II) reacts with water more slowly than does (I). Thus, the reaction of (II) with (III) is also favored.

The linear, or essentially linear, segments formed by the reaction of (I) with (IV) provide the hydrophilic properties of the present foams and the crosslinked segments formed by the reaction of (II) with (III) provide additional stiffening, resilience, compression set-resistance and reduced expansion with absorption of water. The greater the proportion of compound (II) used compared to prepolymer (I), the smaller is the expansion of the foam obtained and the lower is the water pickup of the foam.

In spite of the favored reactions, an occasional isocyanate group of (I) will react with an hydroxyl group of (III) and an occasional isocyanate group of (II) will react with water and the resulting amine function with an isocyanate group of (I). These occasional reactions between the two types of segments combine them into a single, uniform permanent network.

The large stoichiometric excess of water present (with respect to all of the isocyanate groups charged) insures that all of the isocyanate groups will be consumed in the reaction. In addition, the water acts as a heat sink to maintain the reaction temperature below 25° C. This is helpful since the reaction temperature is normally maintained below 25° C. (and preferably from 0 to 10° C.) to ensure development of the density and strength characteristics of the compositions. It has been found that if the temperature is allowed to rise to higher temperatures, the resulting foam is much less dense and has larger pores.

Upon mixing constituents (I), (II), (III) and (IV) (and, if desired, additives of the types mentioned elsewhere herein) the mass is immediately cast into its desired final shape, e.g. molded or coated as a sheet. Thus, upon mixing, it can be knife coated onto a moving web having a release surface (such as polyethylene coated paper) to foam. The foamed material can be either allowed to set and crosslink with the top surface free or it can be levelled and given a predetermined thickness by passing it through a metering gap. At that time a second web with a release surface can, if desired, be applied to the top surface of the foam. The release web or webs can be removed as soon as the foam has finished reacting and crosslinking or can be left in place for storage.

Methods of preparing hydrophilic prepolymer precursors (I) of the general type used in the present invention are disclosed in the art. See for example U.S. Pats. 2,726,-219 and 2,948,691 and "Polyurethanes: Chemistry and Technology," by Saunders and Frisch, part I, Interscience Publishers, New York (1962). Prepolymers of this type suitable for use in the present invention are generally those in which at least half of the repeating alkylene oxide groups are ethylene oxide groups, with the remainder being other alkylene oxide groups, such as propylene oxide and butylene oxide groups.

Ordinarily the prepolymers are prepared by reacting a polyoxyalkylene polyol with a polyisocyanate using an NCO/OH equivalent ratio of at least 2/1 or slightly higher, e.g. 2.1/1 to 2.5/1.

Broadly speaking, the polyoxyalkylene polyols suitable for preparing the hydrophilic prepolymers are water soluble and have molecular weights of at least 300 and as high as 7000 (preferably between about 600 and 2000). The most preferred polyols are polyoxyethylene diols having molecular weights between about 600 and 1500.

Generally the higher the molecular weight of the polyol the tougher and denser are the foams prepared therefrom. Also, the higher the ratio of oxypropylene or other oxyalkylene units to oxyethylene units in those polyols, the greater is the resistance to compression set and the lower is the moisture absorption capacity of the foams prepared therefrom.

Commercially available polyols suitable for use in preparing the prepolymers (I) are: oxyethylene-oxypropylene block copolymer polyols available (from the Wyandotte Chemicals Corporation) under the trade designation "Pluronic," e.g. "Pluronic" "L35," "F38" and "P46"; hydrophilic oxyethylene-oxypropylene random copolymer polyols available commercially (from Jefferson Chemical Co.) under the trade designations "Polyol Functional Fluids" "WL 260" and "WL 580"; and polyethylene glycols available (from the Union Carbide Corporation) under the trade designation "Carbowax," e.g. "Carbowax" "600," "1000," "1540" and "4000."

A particularly preferred prepolymer for use in the present invention is the reaction product of 1 mole of polyethylene glycol 1000 (containing approximately 23 repeating ethylene oxide units) with 2 moles of toluene diisocyanate. In this prepolymer and in other similar prepolymers prepared by reactions between diols and diisocyanates, 2 urethane linkages are formed.

Among the polyfunctional aromatic isocyanate compounds (II) are compounds of the type $R'(NCO)_n$, above. They include, for example, m-phenylene diisocyanate, mixtures of toluene-2,4-diisocyanate and toluene-2,6-diisocyanate, diphenyl-3,3'-dimethyl-4,4'-diisocyanates, diphenyl-3,3'-dimethoxy-4,4' - diisocyanate, diphenylmethane-4,4'-diisocyanate, diphenylmethane-4,4'-diisocyanate, diphenylmethane-4,4'-dimethyl - 3,3' - diisocyanate, 1,5-naphthalene diisocyanate and aromatic polyisocyanates, e.g. poly(methylenephenylene isocyanates) containing an average of from about 2 to 2.8 isocyanate groups per molecule. Such poly(methylenephenylene isocyanates) are commercially available under the trade designations "Mondur MRS" from Mobay Co., "Isonate 901" from Upjohn Co. "PAPI" from the Upjohn Co., etc. Preferred compounds for this use are "Mondur MRS" and a mixture of 80 percent toluene-2,4-diisocyanate and 20 percent toluene-2,6-diisocyanate.

Among the prepolymers (III) are polyalkyleneoxide polyols such as the polypropyleneoxide polyols available from Union Carbide Company under the trade designation "Niax," from Jefferson Chemical Co. under the trade designation "Thanol," and from Mobay Chemical Co. under the trade designation "Multron." Also useful as the hydrophobic prepolymers (III) are the polyester polyols such as those available from Wyandotte Co. under the trade name "Pluracol," from the Mobay Chemical Co. under the trade names "Multrathane R-14, R-26 and R-144," and from the Hooker Chemical Co. under the trade name "Rucoflex Polyester Polyols."

Other materials which may be incorporated into the hydrophilic foamed compositions of the invention may also include additives such as catalysts, surfactants (to aid in mixing the components of the foam), pigments (to provide color), fibers such as nylon, rayon, etc. preferably cut into short pieces of the order of 0.5 inch or less, and mineral fillers such as finely divided calcium carbonate, talc, mica, etc. In addition, medicaments (to provide therapeutic character to the foams), plasticizers, anti-oxidants and perfumes may be added. Absorbent charcoal can also be employed.

A particularly useful additive is elastomeric particles such as ground tire stock, or other dense elastomeric materials (whether of scrap or virgin stock). Preferably, such particles are of a size that they will just pass through a No. 16 U.S. Standard Sieve (openings 0.047 inch) although larger or smaller particles can also be used.

Although the hydrophilic foams of the invention can be prepared without a catalyst, it is often advantageous to use a catalyst to promote the formation of urethane and urea bonds. Appropriate catalysts include, but are not limited to, N-methyl morpholine, N-hydroxyethyl morpholine and triethylene diamine. Typical metallic salt catalysts include, for example, the salts of antimony, tin, iron, lead and mercury, e.g. dibutyltin dilaurate, stannous octoate, phenyl mercuric acetate and the like. Broadly speaking, the catalyst is employed in an amount ranging from about 0.05 to about 1.0, and preferably from about 0.1 to about 0.4 percent, by weight of the prepolymer (I).

Suitable surfactants are known to the art and include polyoxyethylene derivatives of alkyl and aryl hydroxy and carboxy compounds and sulfonated alkyl and aryl compounds, fatty acid soaps, e.g. calcium octoate, and fluorocarbon surfactants.

The following are test procedures used in characterizing and defining the products of the invention.

Water absorbing capacity

The water absorbing capacity (or free water pickup) $\Delta W_f$, is determined by weighing a sample of foam previously dried to constant weight at 25° C. and 50 percent relative humidity ($W_1$), completely saturating it with water by squeezing the foam under water at about 25° C. until the air is expelled, and holding it under water with weights for 15 minutes. The water-saturated foam is then removed from the water using a tared metal hook and allowed to hang until excess surface water has dripped off. The saturated sample is immediately weighed ($W_2$) and the free water pickup is calculated using the formula $$\Delta W_f = \frac{W_2 - W_1}{W_1} \times 100$$

where $\Delta W_f$ is the free water pickup measured as percent weight gain. It is a measure of the total amount of water that may be held by the foam and includes both the water held mechanically in the open pores of the foam and the water absorbed into the cell walls of the foam.

Density

The density, in pounds per cubic foot is determined using foam previously dried to constant weight at 25° C. and 50 percent relative humidity.

Bound water pickup

Bound water pickup is determined by compressing the water saturated sample from the determination of the water absorbing capacity until no more water can be forcibly expelled from the sample. The sample is then weighed ($W_3$) and the bound water pickup $\Delta W_b$ calculated using the formula $$\Delta W_b = \frac{W_3 - W_1}{W_1} \times 100$$

where $W_1$ is as previously defined and $W_b$ is the bound water pickup measured as percent weight gain. It is a measure of the water absorbed into the cell walls of the foam.

Volume change with water absorption

The volume change with water absorption is measured in percent per weight percent of bound absorbed water, i.e.

$$\frac{\Delta V_s}{\Delta W_b}$$

The method of determining $\Delta W_b$ has already been given. $\Delta V_s$ is calculated using the formula $$\Delta V_s = \frac{V_s - V_i}{V_i} \times 100$$

where $V_i$ is the volume of the dry sample (dried to constant weight at 25° C. and 50 percent relative humidity) and $V_s$ is the volume of the sample after soaking in water and expelling the free water as in the bound water pickup procedure.

Twenty-four hour compression set

The 24-hour compression set, $\Delta C$, is expressed as a percentage and is calculated from the formula $$\Delta C = \frac{T_1 - T_2}{T_1} \times 100$$

where $T_1$ is initial foam thickness, $T_2$ is the thickness of the foam after it has been subjected to a force of 15 pounds per square inch for 24 hours and allowed to relax (free of the force) for one hour. The foam is maintained under ambient conditions (approximately 25° C. and 50 percent relative humidity) throughout this test.

The following examples more specifically illustrate the compositions of the invention and the process for their preparation, but are in no way limiting of the scope thereof. The particular constituents used in the examples are representative of the types which they exemplify but could as well be other constituents of the same classes. The percentages and parts in the examples and elsewhere herein are by weight unless otherwise stated.

EXAMPLE 1

The constituents used were as follows:
(I) Polyethylene glycol having a molecular weight of 1000 end capped with toluene diisocyanate and having the formula

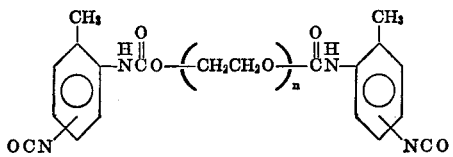

(II) Poly(methylenephenylene isocyanate) having a molecular weight of 380, an isocyanate equivalent weight of 135 (thus containing about 2.8 isocyanate groups per molecule) and available under the trade designation "Mondur MRS" from Mobay Co.

(III) Polyoxypropylene diol having a molecular weight of 2000.

Surface active agent: A polyoxyethylene derivative of fatty acid partial esters of hexitol anhydrides available commercially from the Atlas Powder Company under the trade designation "Tween 80."

Into a suitable vessel provided with a stirrer were charged 100 parts of (I), 13 parts of (II) and 1 part of the surface active agent. The mixture was stirred until thoroughly blended. In another vessel 32 parts of (III) and 100 parts of ice water (about 75 parts ice to 25 parts water) were blended. To this was added the above isocyanate mixture and the resulting mass was stirred thoroughly to produce a homogeneous liquid which was poured into a suitable mold allowing for 5–10 fold expansion. Within minutes the mixture began to foam and within 45 minutes was completely cured.

A sample of this foam was found to have a density of 10.8 lbs./cu. ft., $\Delta W_f$ (water absorbing capacity) of 870%, $\Delta W_b$ (bound water pickup) of 145%, $\Delta V_s$ (volume change with water absorption) of 28%, $\Delta V_s/\Delta W_b$ of 0.19 percent per weight percent of absorbed water, and a 24 hour compression set of 67%.

EXAMPLE 2

The constituents were as follows:
(I) Polyethylene glycol having a molecular weight of 1000 end capped with a mixture of 80% toluene-2,4-diisocyanate and 20% toluene-2,6-diisocyanate.
(II) Poly(methylenephenylene isocyanate) as in Example 1.
(III) A mixture of 55% of polyoxypropylene diol having a molecular weight of 2000 and 45% polyoxypropylene triol having a molecular weight of 1600.

Surface active agent. A fluorochemical surfactant of the type disclosed in U.S. Pat. No. 3,378,399.

Other additives. Bentonite, t-butylphenol, calcium octoate and phenyl mercuric acetate.

The diol and triol of (III) were premixed with the other additives in the following proportions

| | Parts |
|---|---|
| Polyoxypropylene diol, M.W.=2000 | 29.62 |
| Polyoxypropylene triol, M.W.=1600 | 24.08 |
| Bentonite | 45.15 |
| t-Butyl phenol (mold inhibitor preservative) | 0.40 |
| Calcium octoate | 0.30 |
| Phenyl mercuric acetate | 0.45 |
| Total | 100.00 | to prepare a polyol masterbatch.

Into a suitable vessel provided with a stirrer were charged 100 parts of (I), 5 parts of (II) and 1 part of the fluorochemical surface active agent. The mixture was stirred until thoroughly blended. In another vessel 45 parts of the polyol masterbatch and 100 parts of ice water (75 parts ice and 25 parts water) were stirred until homogeneous. The polyol-ice water mixture was then added to the isocyanate mixture and thoroughly blended for about 1 to 3 minutes to produce a homogeneous liquid which was poured into a suitable mold to allow for a 5 to 10 fold expansion. Within minutes the mixture began to foam and within 45 minutes at about 25° C. was completely cured.

The nearly white foam was soft and resilient. It had tough smooth surfaces at the air and mold interfaces and was readily slit and skived by automatic equipment. A sample of the foam was found to have a density of about 10 lbs./cu. ft., $\Delta W_f$ of 710%, $\Delta W_b$ of 150%, $\Delta V_s$ of 25%, $\Delta V_s/\Delta W_b$ of 0.17 a 24 hour compression set of 62 percent and a tensile strength of 35 p.s.i.

To illustrate foams prepared without the structurally reinforcing agent of the invention, Example 2 was repeated without adding the polyalkylene polyols (III). The properties of this control foam and those of the foam of the invention are compared in the following table:

| | Control | Example 2 |
|---|---|---|
| Percent: | | |
| $\Delta W_f$ | 675 | 710 |
| $\Delta W_b$ | 175 | 150 |
| $\Delta V_s$ | 218 | 25 |
| $\Delta V_s/\Delta S_b$ | 1.25 | 0.17 |
| Density, lb./cu. ft. | 22 | 10 |

Thus, the foam of the invention is approximately half as dense and 8–9 times more dimensionally stable (with respect to moisture content) than the control foam.

EXAMPLE 3

Into a suitable vessel provided with a stirrer were charged 100 parts of (I), 10 parts of (II) and 1 part of surface active agent, all as defined in Example 1. Into another stirred vessel 100 parts of the polyol masterbatch of Example 2 and 100 parts of ice water were charged. Both mixtures were separately blended then mixed together until thoroughly blended (approximately 2 minutes) and then immediately poured into a suitable mold. A sample of the dried foam was found to have a density of 12.3 lb./cu. ft., $\Delta W_f$ of 700%, $\Delta W_b$ of 110%, $\Delta V_s$ of 21%, $\Delta V_s/\Delta W_b$ of 0.20 and a 24 hours compression set of 61%.

EXAMPLE 4

Into a suitable vessel provided with a stirrer were charged 100 parts of a hydrophilic isocyanate-terminated prepolymer (I) (a polyoxyethylenediol having a molecular weight of 1540 end capped with toluene diisocyanate, the total molecular weight being 1888), 5 parts of poly-(methylenephenylene isocyanate) and 2 parts of surface active agent, the latter two constituents being as in Example 1. In another vessel 45 parts of the polyol masterbatch of Example 2 and 100 parts of ice water were blended. The two were combined and thoroughly mixed after which they were poured into a mold.

A sample of the resulting foam had a density of 11.8 lb./cu. ft., $\Delta W_f$ of 880%, $\Delta W_b$ of 260%, $\Delta V_s$ of 33.5%, $\Delta V_s/\Delta W_b$ of 0.13 and a 24-hour compression set of 70%.

EXAMPLE 5

The cured foam of Example 2 was skived into sheets ¼ inch thick and subjected to needle punching to attach a rando-web batt thereto. The rando-web consisted of 3 denier rayon fibers approximately 1 9/16 inches in length. It was about 1 inch in thickness and had a density of 1.6 pounds per cubic foot prior to needle punching. The needle punching was accomplished using 1 inch strokes, 50 to 75 needles per square inch, and 300 strokes per minute. The rando-web was compressed to about ⅛ inch in thickness in the combined material. The measured properties of the combined material were as follows: tensile strength 60 p.s.i., 24-hour compression set ($\Delta C$) 50%, density 11.5 lbs./ft.³, $\Delta W_t$ 700%, $\Delta W_b$ 150%, $\Delta V_s$ 15%, $\Delta V_s/\Delta W_b$ 0.19.

What is claimed is:

1. A resilient, crosslinked, hydrophilic, open-celled polyoxyalkylene urea/urethane foam comprising two types of relatively high molecular weight segments as follows:

(A) hydrophilic segments of an essentially linear chain of subsegments each containing a polyoxyalkylene chain bonded on either end through urethane linkages, the subsegments being bonded to one another through urea links, at least 50% of the individual oxyalkylene groups therein being oxyethylene groups, and (B) hydrophobic segments containing polyoxyalkylene chains and aromatic hydrocarbon groups predominently interconnected by urethane links, the individual oxyalkylene groups substantially all containing more than two carbon atoms.

the foam having (1) a water absorbing capacity of at least about 700 percent by weight;

(2) a density of at least 8 pounds per cubic foot (125 kg./m.³);

(3) a volume change upon absorption of water of less than 0.4 percent per weight percent of absorbed water;

(4) a twenty-four hour compression set of less than 75 percent;

(5) a bound water pickup of at least about 100 percent by weight.

2. A foam according to claim 1 wherein the polyoxyalkylene chains in the hydrophobic segments are polyoxypropylene chains.

3. A foam according to claim 1 in which the polyoxyalkylene chains in the hydrophilic segments are polyoxyethylene chains.

4. A foam according to claim 1 in which the subsegments in the hydrophilic segments conform to the formula

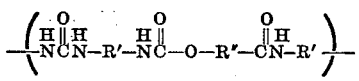

wherein R' is a divalent aryl hydrocarbyl group containing from 6 to 18 carbon atoms and R'' is an ethylene oxide chain.

5. A foam according to claim 4 in which R' is

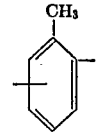

6. The process which comprises (1) forming a miscible blend of 100 parts of a water soluble linear hydrophilic isocyanate-terminated polyoxyalkylene prepolymer having a molecular weight of from about 400 to 3000 and in which at least 50 percent of the oxyalkylene groups are oxyethylene and from 3 to 15 parts of an aromatic isocyanate compound having an isocyanate functionality greater than 2 and an equivalent weight with respect to isocyanate of from about 80 to 240, (2) dispersing 20 to 60 parts of a linear hydrophobic hydroxyl-terminated polyalkylene oxide prepolymer having a molecular weight of about 400 to 6000 in at least 20 parts of water, (3) mixing the blend of step (1) with the dispersion of step (2) at a temperature at which the dispersion is liquid, but not above 10° C. to form a homogeneous mixture, and (4) maintaining the mixture at a temperature below 25° C. until the resulting chemical reaction is substantially complete and a solid foam has been formed.

References Cited

UNITED STATES PATENTS 3,326,823 6/1967 Landler et al. ____ 260—2.5 AD
3,432,448 3/1969 Sambeth et al. ____ 260—2.5 AD MAURICE J. WELSH, Primary Examiner U.S. Cl. X.R.

161—154; 260—2.5 AM, 2.5 AP